(12) United States Patent
Li et al.

(10) Patent No.: US 7,183,234 B2
(45) Date of Patent: Feb. 27, 2007

(54) MULTI-DONOR CATALYST SYSTEM FOR THE POLYMERIZATION OF OLEFINS

(75) Inventors: Robert Tan Li, Houston, TX (US); Kevin Wayne Lawson, Seabrook, TX (US); Aspy Keki Mehta, Humble, TX (US); Prasadarao Meka, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 300 days.

(21) Appl. No.: 10/835,337

(22) Filed: Apr. 29, 2004

(65) Prior Publication Data

US 2005/0245698 A1 Nov. 3, 2005

(51) Int. Cl.
*C08F 4/642* (2006.01)
*C08F 4/649* (2006.01)

(52) U.S. Cl. .................. 502/116; 526/124.8
(58) Field of Classification Search ........... 502/116; 526/124.8
See application file for complete search history.

(56) References Cited

U.S. PATENT DOCUMENTS 6,376,628 B1 * 4/2002 Ikai et al. ................. 526/128

FOREIGN PATENT DOCUMENTS

| CA | 2204464 | 5/1998 |
|----|---------|--------|
| EP | 0 841 348 | 5/1998 |
| EP | 0 911 338 | 4/1999 |
| EP | 0 959 083 | 11/1999 |
| JP | 08 143620 | 6/1996 |
| JP | 08143621 | 6/1996 |
| JP | 08 217841 | 8/1996 |
| JP | 08 231663 | 9/1996 |
| JP | 08 301920 | 11/1996 |
| JP | 09 067379 | 3/1997 |
| JP | 09 278819 | 10/1997 |
| JP | 10231316 | 9/1998 |
| JP | 10292008 | 11/1998 |
| JP | 11060582 | 3/1999 |
| JP | 11106389 | 4/1999 |
| JP | 11106390 | 4/1999 |
| JP | 11106434 | 4/1999 |
| JP | 11147906 | 6/1999 |
| JP | 11147923 | 6/1999 |
| JP | 11228584 | 8/1999 |
| JP | 1999263805 | 9/1999 |
| JP | 11269219 | 10/1999 |
| JP | 11322830 | 11/1999 |
| JP | 11349620 | 12/1999 |
| JP | 2000001493 | 1/2000 |
| JP | 2000017009 | 1/2000 |
| JP | 2000034313 | 2/2000 |
| JP | 2000063417 | 2/2000 |
| JP | 2000063419 | 2/2000 |
| JP | 2000 109514 | 4/2000 |
| JP | 2000186109 | 7/2000 |
| JP | 2000186110 | 7/2000 |
| JP | 2000 273113 | 10/2000 |
| JP | 2000336113 | 12/2000 |
| JP | 2001106717 | 4/2001 |
| JP | 2001 122917 | 5/2001 |
| JP | 2001240634 | 9/2001 |
| JP | 2001247617 | 9/2001 |
| WO | WO 03/106512 | 12/2003 |
| WO | WO 2004/016662 | 2/2004 |

OTHER PUBLICATIONS

Yao, Shigeru et al, "Theoretical consideration of the external donor of heterogeneous Ziegler-Natta catalysts using molecular mechanics, molecular dynamics, and QSAR analysis", Macromolecular Theory and Simulations, 2001, pp. 850-854 10(9).

Inventors: Ikeuchi et al., entitled "Study on Aminosilane Compounds as External Electron Donors in Isospecific Propylene Polymerization" Journal of Molecular Catalysis A: Chemical, Elsevier, Amsterdam, NL, vol. 193, No. 1/2, 2003, pp. 207-215.

* cited by examiner

*Primary Examiner*—Caixia Lu
(74) *Attorney, Agent, or Firm*—Leandro Arechederra; Shawn H. Foster

(57) ABSTRACT

The present invention provides catalyst systems including a Ziegler-Natta or Ziegler-Natta-type catalyst in combination with a mixture of certain electron donors.

12 Claims, 1 Drawing Sheet

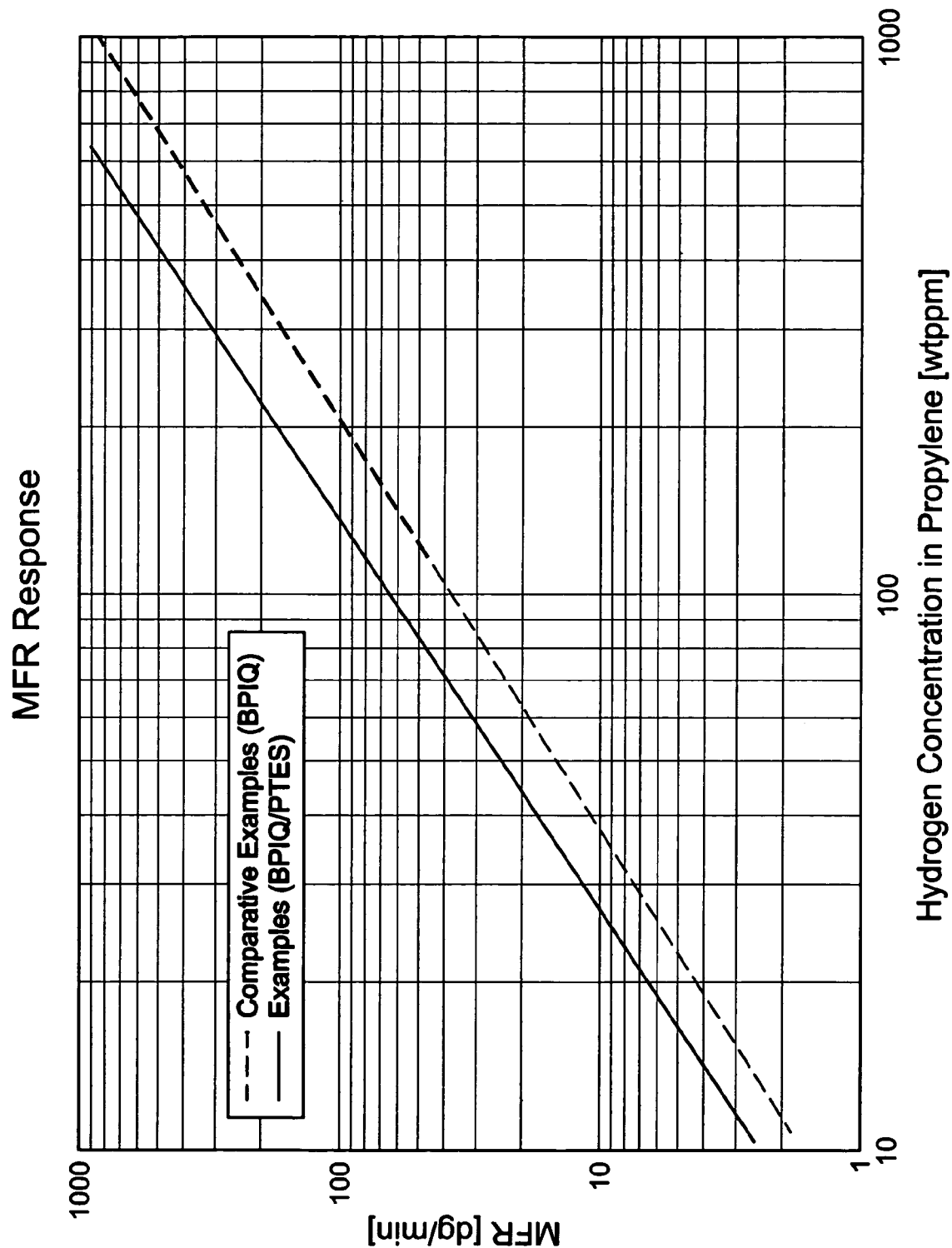

MULTI-DONOR CATALYST SYSTEM FOR THE POLYMERIZATION OF OLEFINS

FIELD OF THE INVENTION

The present invention relates to catalyst systems for the polymerization of polyolefins. In particular, the invention relates to catalyst systems including electron donors including a mixture of a diaminodialkoxysilane and a trialkoxysilane or tetraalkoxysilane for the polymerization of propylene polymers.

BACKGROUND

Over the last several decades, propylene polymers have become of great importance in several end use applications. From packaging for consumer goods to automotive components, propylene polymers have demonstrated wide applicability. Useful propylene polymers may generally be produced using Ziegler-Natta catalysts comprising 1) a solid titanium catalyst component consisting of a titanium compound, a magnesium compound, and an internal electron donor; 2) a co-catalyst such as an organoaluminum compound, and 3) external electron donors. The art is full of attempts of variations and specific combinations of the aforementioned catalyst components. The art has recognized that such variations and combinations are both unpredictable but advantageously influential on polymer properties. Therefore, the discovery of more variations and combinations of external electron donors, among other components, to accompany solid titanium catalyst has been of great benefit to improving the efficiency of the catalyst systems and the control of the polymer properties.

For example, external electron donors are used to control the stereoregularity and form of the polymer. Although a broad range of compounds are known generally as electron donors, a particular catalyst may have a specific compound or combinations of compounds with which it is especially compatible. Discovery of an appropriate type of electron donor can lead to significant improvements in the properties of the polymer such as molecular weight distribution and melt flow rate. Discovery of specific electron donors or combinations thereof for solid titanium based supported catalysts that would provide beneficial results would be highly advantageous in certain applications. Among these electron donors, organosilicon compounds, siloxanes or silanes have been of particular interest.

In particular, U.S. Pat. No. 6,376,628 and JP 1999263805A disclose the use of bis(perhydroisoquinolino) dimethoxysilane (BPIQ), among other catalyst components, in the polymerization of propylene. Other background references include CA 2 204 464, EP 0 841 348, JP 2001247617, JP 2001240634, JP 2001106717, JP 2000336113, JP 2000186110, JP 2000186109, JP 2000063419, JP 2000063417, JP 2000034313, JP 2000017009, JP 11349620, JP 11322830, JP 11269219, JP 11147906, JP 11147923, JP 11106434, JP 10292008, JP 10231316, JP 08143621, and JP 11106434. However, the art has yet to address every combination of BPIQ with other electron donors with certain catalyst systems to achieve a good balance of polymer properties.

The present invention fulfills this need by providing for catalyst systems and polymerization processes including electron donors including a mixture of a diaminodialkoxysilane, such as BPIQ, and a tetraalkoxysilane, such as tetraethoxysilane, or a trialkoxysilane, such as propyltriethoxysilane, in combination with a solid titanium catalyst system. Such combinations advantageously provide for a better balance of propylene polymer properties as can be observed, for example, through broad molecular weight distributions and wider ranges of desirable MFRs.

SUMMARY OF THE INVENTION

In an embodiment, the invention provides for a catalyst system comprising:
(a) a solid magnesium supported titanium catalyst component;
(b) an organoaluminum co-catalyst; and
(c) a mixture of a diaminodialkoxysilane and at least one other silane compound.

In another embodiment, the invention provides for a polymerization process comprising contacting monomers such as alpha-olefins, a Ziegler-Natta-type catalyst, an organoaluminum co-catalyst, and an electron donor mixture comprising a diaminodialkoxysilane and at least one other silane compound.

In yet another embodiment, the invention provides for propylene polymers produced by the process comprising contacting:
(a) a solid magnesium supported titanium catalyst component;
(b) an organoaluminum co-catalyst;
(c) an electron donor mixture comprising a diaminodialkoxysilane and at least one other silane compound; and
(d) monomers.

In another embodiment, the invention provides for articles described in more detail below made from polymers described herein.

In any of the previous embodiments, the diaminodialkoxysilane may comprise bisperhydroisoquinolyldimethoxysilane (BPIQ).

In any of the previous embodiments, the at least one other silane compound may comprise tetraethoxysilane (TEOS), methylcyclohexyldimethoxysilane (MCMS), propyltrimethoxysilane (PTMS), propyltriethoxysilane (PTES), methytrimethoxysilane (MTMS), dimethyldimethoxysilane (DMDMS), dicyclopentydimethoxysilane (DCPMS), or mixtures thereof.

In any of the previous embodiments, the at least one other silane compound may be selected from the group consisting of tetraethoxysilane (TEOS), methylcyclohexyldimethoxysilane (MCMS), propyltrimethoxysilane (PTMS), propyltriethoxysilane (PTES), methytrimethoxysilane (MTMS), dimethyldimethoxysilane (DMDMS), dicyclopentydimethoxysilane (DCPMS), and mixtures thereof.

In any of the previous embodiments, the diaminodialkoxysilane may comprise bisperhydroisoquinolyldimethoxysilane (BPIQ) and the at least one other silane compound comprises tetraethoxysilane (TEOS), propyltriethoxysilane (PTES), or mixtures thereof.

In any of the previous embodiments, the diaminodialkoxysilane may be bisperhydroisoquinolyldimethoxysilane (BPIQ) and the at least one other silane compound may be selected from the group consisting of tetraethoxysilane (TEOS), propyltriethoxysilane (PTES), or mixtures thereof.

In any of the previous embodiments, the mole ratio of bisperhydroisoquinolyldimethoxysilane, when present, to the at least one other silane compound added to the catalyst system is from 95/5 mole ratio to 50/50 mole ratio.

In any of the previous embodiments, the mole ratio of bisperhydroisoquinolyldimethoxysilane, when present, to the at least one other silane compound added to the catalyst system is from 80/20 mole ratio to 60/40 mole ratio.

In any of the previous embodiments, the mole ratio of bisperhydroisoquinolyldimethoxysilane, when present, to the at least one other silane compound added to the catalyst system is from 75/25 mole ratio to 65/35 mole ratio.

In any of the previous embodiments, the mole ratio of bisperhydroisoquinolyldimethoxysilane, when present, to the at least one other silane compound added to the catalyst system is at least from 70/30 mole ratio.

In any of the previous embodiments, the solid magnesium supported titanium catalyst component may comprise a magnesium supported $TiCl_4$ catalyst comprising $TiCl_4$ and the organoaluminum co-catalyst may comprise triethylaluminum.

BRIEF DESCRIPTION OF THE DRAWINGS

FIG. 1 shows a plot of MFRs/hydrogen concentration response in propylene (wtppm) of propylene polymers for Inventive Examples and Comparative Examples.

DETAILED DESCRIPTION OF INVENTION

Various specific embodiments, versions and examples of the invention will now be described, including preferred embodiments and definitions that are adopted herein for purposes of understanding the claimed invention. However, for purposes of determining infringement, the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

As used herein, the new numbering scheme for the Periodic Table of Elements Groups are used as in HAWLEY'S CONDENSED CHEMICAL DICTIONARY 852 (John Wiley & Sons, 13th ed. 1997).

As used herein, the term "polypropylene polymer(s)" or "propylene polymer(s)" refers to homopolymers, copolymers, terpolymers, and interpolymers made from propylene derived units. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form the monomer. Likewise, when catalyst systems are said to comprise catalyst components, it is well understood by one skilled in the art, that the catalyst system comprises the catalyst system component as present in the catalyst system or in the catalyst system component's derived form.

As used herein, unless differentiated, "polymerization" includes homopolymerization, copolymerization, terpolymerization, and interpolymerization.

As used herein, "crystalline" is defined as having identifiable peak melting points above about 100° C. as determined by Differential Scanning Calorimetry (DSC peak melting temperatures).

As used herein, "isotactic" is defined as having at least 40% isotactic pentads according to analysis by $^{13}C$-NMR.

As used herein, "molecular weight" means weight average molecular weight (Mw). Mw is determined using Gel Permeation Chromatography. Molecular Weight Distribution (MWD) means Mw divided by number average molecular weight (Mn). (For more information, see U.S. Pat. No. 4,540,753 to Cozewith et al. and references cited therein, and in Verstrate et al., 21 *Macromolecules* 3360 (1998)). The "Mz" value is the high average molecular weight value, calculated as discussed by A. R. Cooper in CONCISE ENCYCLOPEDIA OF POLYMER SCIENCE AND ENGINEERING 638–39 (J. I. Kroschwitz, ed. John Wiley & Sons 1990).

Electron donors are typically used in two ways in the formation of a catalyst system. First, an internal electron donor may be used in the formation reaction of the solid catalyst. Examples of internal electron donors include: amines, amides, ethers, esters, aromatic esters, ketones, nitrites, phosphines, stibines, arsines, phosphoramides, thioethers, thioesters, aldehydes, alcoholates, and salts of organic acids.

The second use for an electron donor in a catalyst system is as an external electron donor and stereoregulator in the polymerization reaction. The same compound may be used in both instances, although typically they are different. A common external electron donor is an organic silicon compound, for example, tetraethoxysilane. A description of the two types of electron donors is provided in U.S. Pat. No. 4,535,068.

Embodiments of the invention relate particularly to external electron donors; the term "electron donor" as used herein refers to the external donor. In some embodiments, the external electron donor acts as a stereoregulator to control the amount of atactic form of polymer produced. It may also increase the production of isotactic polymers. In these functions, the molecular weight distribution (MWD), high crystallinity, and MFR of produced polymer will be affected by the particular donor used. Organic silicon compounds are generally known in the art for use as electron donors. Examples of electron donors that are organic silicon (or "silane") compounds are disclosed in U.S. Pat. Nos. 4,218,339; 4,395,360; 4,328,122; 4,473,660; 6,133,385; and 6,127,303.

In an embodiment, the invention provides for catalyst systems for the polymerization of olefins comprising:
 (a) a solid titanium catalyst component;
 (b) an organoaluminum co-catalyst; and
 (c) a mixture of at least two electron donors, for example, wherein the mixture comprises 1) bis(perhydroisoquiniline) dimethoxysilane and 2) a secondary electron donor.

The secondary electron donor is selected from the group consisting of tetraethoxysilane, propyltriethoxysilane, vinyltriethoxysilane, methyltriethoxysilane, methyltrimethoxysilane, propyltrimethoxysilane, and dimethyldimethoxysilane.

In another embodiment, the catalyst component involved in the present invention is a Ziegler-Natta-type solid titanium catalyst for the polymerization of olefins. In an embodiment, the catalyst system comprises:
 (a) a magnesium chloride supported titanium catalyst component comprising magnesium and titanium and an internal electron donor,
 (b) an organoaluminum compound, and
 (c) a mixture comprising a diaminodialkoxysilane, such as bisperhydroisoquinolyldimethoxysilane (herein BPIQ) and a tetraalkoxysilane, such as tetraethoxysilane (herein TEOS), or a trialkylalkoxysilane, such as propyltriethoxysilane (herein PTES).

In one embodiment, the solid catalyst is a magnesium supported $TiCl_4$ catalyst and the organoaluminum co-catalyst is triethylaluminum.

The method of polymerizing olefins in the presence of these Ziegler-Natta-type catalysts are well known in the art, and are discussed, for example, by in *Concise Encyclopedia of Polymer Science and Engineering*, 1087–1107 (Jacqueline I. Kroschwitz ed., 1990) and by F. A. Cotton & G. Wilkinson, *Advanced Inorganic Chemistry*, 1280–1282 (4th ed. 1980). Typical solid magnesium supported catalyst systems and preparations thereof are outlined in U.S. Pat. Nos. 4,990,479 and 5,159,021, and WO 00/44795. For example, Ziegler-Natta catalysts are typically composed of a transition metal compound from groups 4–7 and an organometallic compound of a metal from groups 11–13 of the periodic table. Well-known examples include $TiCl_3$-$Et_2AlCl$, $AlR_3$-$TiCl_4$ wherein Et is an ethyl group and R represents an alkyl group. These catalysts include mixtures of halides of transition metals, especially titanium, chromium, vanadium, and zirconium, with organic derivatives of nontransition metals, particularly alkyl aluminum compounds.

Component (b) (see above) is an organoaluminum compound or co-catalyst. In an embodiment, the organoaluminum compound should be halogen-free. Suitable halogen-free organoaluminum compounds (component (b)) are, in particular, branched, unsubstituted alkylaluminum compounds of the formula $AlR_3$, wherein R denotes an alkyl radical having 1 to 10 carbon atoms, such as for example, trimethylaluminum, triethylaluminum, triisobutylaluminum, and tridiisobutylaluminum. Further suitable compounds are readily available and amply disclosed in the prior art including U.S. Pat. No. 4,990,477.

In an embodiment, the electron donor comprises a mixture of a diaminodialkoxysilane, such as BPIQ and at least one other silane compound. The at least one other silane may be a tetraalkoxysilane, such as TEOS, or a trialkylalkoxysilane, such as PTES.

In other embodiments, the at least one other silane compound may comprise, for example, tetraethoxysilane ("TEOS"), methylcyclohexyldimethoxysilane ("MCMS"), propyltrimethoxysilane ("PTMS"), propyltriethoxysilane ("PTES"), methytrimethoxysilane ("MTMS"), dimethyldimethoxysilane ("DMDMS"), dicyclopentydimethoxysilane ("DCPMS"), or mixtures thereof.

In another embodiment, the at least one other silane compound may be selected from the group consisting of, for example, tetraethoxysilane ("TEOS"), methylcyclohexyldimethoxysilane ("MCMS"), propyltrimethoxysilane ("PTMS"), propyltriethoxysilane ("PTES"), methytrimethoxysilane ("MTMS"), dimethyldimethoxysilane ("DMDMS"), dicyclopentydimethoxysilane ("DCPMS"), and mixtures thereof.

In order to achieve desired melt flow rates and broad molecular weight distributions of the propylene polymers, the relative mole ratios of the election donors are adjusted.

In certain embodiments, the mole ratio of bisperhydroisoquinolyldimethoxysilane to the at least one other silane compound added to the catalyst system may be from 95/5 mole ratio to 50/50 mole ratio.

In certain embodiments, the mole ratio of bisperhydroisoquinolyldimethoxysilane to the at least one other silane compound added to the catalyst system may be from 75/25 mole ratio to 65/35 mole ratio.

In certain embodiments, the mole ratio of bisperhydroisoquinolyldimethoxysilane to the at least one other silane compound added to the catalyst system may be at least from 70/30 mole ratio.

In certain embodiments, it has been found that when the aforementioned electron donor mixtures are used in combination with a solid titanium catalyst system, a good balance of polymer properties may be obtained, as observed, for example, through broad molecular weight distributions and desirable MFRs as discussed in further detail below.

In one embodiment, propylene monomers are polymerized using the methods of the invention, and the resultant polypropylene has a MFR of 14 to 180 dg/min. In another embodiment, the molecular weight distribution (Mw/Mn) of the resultant propylene polymer has a range of 5.5–10.0 as discussed in more detail below. Improved articles, such as films and injected molded parts, may be made due to the improved characteristics of the polyolefins, such as propylene polymers, produced by the methods and catalyst systems as herein disclosed.

Polymerization Process

The catalyst systems of the invention described above are suitable for use in any polymerization process that would produce polyolefins, such as propylene polymers, as described herein. Polymerization techniques for olefin polymerization, such as propylene polymerization, can be solution polymerization, slurry polymerization or gas phase polymerization techniques. Methods and apparatus for effecting such polymerization reactions are well known. Polymerization processes of the present invention may employ solution, fixed-bed, moving-bed, fluid-bed, gas phase, slurry phase, and high pressure processes, or combinations thereof, and be conducted in single, series, or parallel reactors. In certain embodiments, particularly preferred continuous processes, including diluent slurry, bulk slurry (loop and stirred tank), and gas phase (stirred and fluid bed). When two or more reactors are operating in a continuous process, the multiple reactors can be all of the same type or they may be any combination of the types.

In another embodiment, the polymerization process of the present invention may also include a batch polymerization process.

In one embodiment, the processes of the invention are directed toward a slurry or gas phase polymerization process of one or more olefin monomers, having from 2 to 30 carbon atoms, alternatively 3 to 12 carbon atoms, and alternatively 3 to 8 carbon atoms, such as propylene.

In other embodiments, the invention is particularly well suited to the polymerization of two or more olefin monomers of ethylene, propylene, butene-1, pentene-1,4-methyl-pentene-1, hexene-1, octene-1, and decene-1.

In other embodiments, examples of olefins that can be used in the polymerization process of the present invention are alpha-olefins having 2 to 20 carbon atoms such as ethylene, propylene, 1-butene, 4-methyl-1-pentene, 1-octene, 1-hexene, 3-methyl-1-pentene, 3-methyl-1-butene, 1-decene, 1-tetradecene, and 1-eicosine.

In yet another embodiment, propylene is polymerized with at least two different comonomers, optionally one of which may be a diene, to form a terpolymer.

In other embodiments, for copolymerization, terpolymerization and interpolymerization, monomers may also include $C_2$ to $C_{12}$ α-olefins and other α-olefin, α-olefinic diolefin, or non-conjugated diolefin monomers. Monomers also include $C_4$–$C_{20}$ diolefins and $C_4$–$C_{20}$ cyclic olefins. Other monomers include olefinically unsaturated monomers such as styrene, alkyl-substituted styrene, ethylidene norbornene, norbornadiene, dicyclopentadiene, vinylcyclohexane, vinylcyclohexene, acrylates. Monomers may also include cyclic olefins such as cyclopentene, norbornene, and alkyl-substituted norbornenes. Further, monomers may include α-olefinic macromonomers produced in-situ or added from another source.

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

In another embodiment, a slurry polymerization process is employed. Such a process generally uses pressures in the range of from about 1 to about 50 atmospheres and even greater and temperatures in the range of 0° C. to about 120° C. In a preferred embodiment, the polymerization process uses pressures in the range of from about 23 to about 38 atmospheres, more preferably from about 24 to about 32 atmospheres and temperatures in the range of 57° C. to about 77° C., more preferably from about 58° C. to about 74° C. In a slurry polymerization, a suspension of solid, particulate polymer is formed in liquid propylene to which ethylene and comonomers and often hydrogen along with catalyst are added. The suspension including monomer is intermittently or continuously removed from the reactor where the volatile components are separated from the polymer and recycled, optionally after a distillation, to the reactor. The propylene should be liquid under the conditions of polymerization.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing one or more loop reactors and those utilizing one or more stirred reactors in series, parallel, or combinations thereof. Non-limiting examples of slurry processes include continuous loop or stirred tank processes. Also, other examples of slurry processes are described in U.S. Pat. No. 4,613,484.

Polymers

Although the invention provides processes suitable to polymerize olefins, a preferred embodiment is directed at the production of propylene polymers. The propylene polymers, desirably crystalline isotactic propylene polymers, include one or more homopolymers, copolymers, terpolymers, and interpolymers. When two or more polymers are combined to produce a blend or a polymer composition, such as a propylene polymer composition, the blend may be a reactor blend or a blend of two or more polymers effected by post polymerization mixing such as through melt mixing in an extruder.

In an embodiment, the polymers, such as the propylene polymers, are characterized by molecular weight distributions (MWD) in the range of from 5.5 to 20.0, alternatively from 5.8 to 20.0, alternatively from 6.0 to 12.0, alternatively from 6.0 to 10.0, and alternatively from 7.0 to 15.0.

In an embodiment, the polymers have a melt flow rate (MFR) in the range of from 14 dg/min to 5000 dg/min, alternatively from 14 dg/min to 200 dg/min, alternatively from 14 dg/min to 180 dg/min, and alternatively from 16 dg/min to 180 dg/min.

In an embodiment, the polymers have weight average molecular weights (MW) that are in the range of from about 10,000 to about 2,000,000, preferably from about 25,000 to about 1,000,000, preferably from about 25,000 to about 500,000, and preferably less than 500,000. The Mz values for the polymers of the present invention range from 25,000 to 2,000,000, and preferably from 50,000 to 1,500,000.

In an embodiment, the polymers have a melting point (Tm) of from 70 to 185° C., preferably from 90 to 175° C., and even more preferably from 100 to 175° C.

In an embodiment, the polymers of the invention may provide a molded part flexural stiffness greater than 300,000 psi (2070 MPa), depending on the melt flow rate (MFR) of the polymer. For example, a value of 335,000 psi (2312 MPa) was measured on a nucleated (0.1 wt % sodium benzoate nucleating agent) molded part from a 15 MFR homopolymer. For reference, a typical propylene homopolymer from a 4th generation Ziegler-Natta catalyst would show a nucleated molded part stiffness of about 280,000 psi (1932 MPa).

In some embodiments of the invention, the polymers of the invention may be combined with one or more other polymers, including but not limited to, thermoplastic polymer(s) and/or elastomer(s) blended through conventional methods well-known in the art. Additionally, the polymers of the invention may also be functionalized by methods also well known in the art.

The polymers of the present invention may also be combined with conventional additives such as plasticizers to form polymer compositions such as propylene polymer compositions using materials and methods well-known in the art.

INDUSTRIAL APPLICABILITY

The inventive propylene polymer compositions of the invention are extremely useful for melt blown (MB) fabrics, spunbond (SB) fabrics, injection molded articles, thermoformed articles, laminates, composites, and films.

End use applications for the polymers of this invention may be categorized as:
  i) applications where the broad MWD provides fabricating advantages during melt processing (e.g. greater degree of shear thinning during extrusion; higher melt strength, etc.); or
  ii) applications where the broad MWD provides mechanical property benefits through enhanced orientation effects (e.g. higher molded part flexural stiffness derived from a favorable orientation of the skin and shear layers).

Additionally, the inventive polymers such as propylene polymers, including homopolymers, random copolymers and impact copolymers can be used over a wide range of end-product applications. Examples of end-use applications are thermoforming (particularly large part thermoforming), blown film, injection molding, biaxially oriented film, blow molding, foam extrusion, extrusion coating, and dynamic vulcanization to produce thermoplastic vulcanizates.

The inventive polymer compositions can be utilized neat, or in combination with other polymers. For example, the inventive polymers could be used as one layer in a coextruded film structure.

Test Methods

Melt Flow Rate: MFR was measured according to ASTM D1238 test method, at 230° C. and 2.16 kg load, and is expressed as dg/min or g/10 min. In an embodiment, the MFR applies to measurements of the ICP and the composition.

Melting Point: The melting point (Tm) is determined by differential scanning calorimetry (DSC). For example, the method proceeds as follows. From 6 to 10 mg of a sheet of the polypropylene polymer is pressed at approximately 200° C. to 230° C. and is removed with a punch die. The sample is then annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 185° C., and occurs between the temperatures of 0° C. and 200° C. The thermal output in joules is a measure of the heat of fusion. The melting point is recorded as the temperature of the greatest heat absorption within the range of melting of the sample. This is called the first melt. The sample is then cooled at a rate of 10° C./min to 25° C. The non-isothermal crystallization temperature is recorded as the temperature of greatest heat generation, typically between 100° C. and 125° C. The area under the peak corresponds to the heat of crystallization. The sample is remelted by heating a second time, called the second melt, and is more reproducible than the first melt. The peak melting temperature from the second melt is recorded as the "2d Tm."

Tensile at Yield and Elongation: Tensile strength at yield was measured according to ASTM D638, with a crosshead speed of 50.8 mm/min, and a gauge length of 50.8 mm, using an Instron machine.

Flexural Modulus: The flexural modulus was obtained according to ASTM D790A, with a crosshead speed of 1.27 mm/min (0.05 in/min), and a support span of 50.8 mm, using an Instron machine.

Notched Izod: The room temperature notched Izod impact strength ("RTNI") is measured according to ASTM D256 test method. The impact strength equipment is made by Testing Machines Inc.

Heat Deflection Temperature: Heat Deflection Temperature ("HDT") is a measure of material stiffness as a function of temperature and is expressed in degrees Celsius. End gated rectangular bars of dimension 127 mm×12.7 mm×3.2 mm are used, which are tested under a three point flexural load of 455 kPa, for a 0.25 mm deflection. (ASTM D648-97).

Rockwell Hardness: The Rockwell hardness is measured using the ASTM D785, using an injection molded 0.125 inches thickness (0.28 cm) circular disk, on R-scale.

Gloss: The gloss (referred to as specular gloss) is measured at 60° using the ASTM D523, using an injection molded 0.125 inches thickness (0.28 cm) circular disk.

EXAMPLES

The following examples proceeded according to the following procedure. The polymerization process occurred in a batch reactor. A 2 liter polymerization reactor that has been thoroughly cleaned, dried, and purged well with nitrogen was charged, by a syringe the required amount of silane donors (0.2 mmol) (BPIQ and PTES) and triethylaluminum (2 mmol). A specified amount of hydrogen in mmoles (12.5–41.7 mmoles) was charged from a 300-ml container under high hydrogen pressure. Approximately 750-ml of liquid propylene was introduced into the reactor. Catalyst in the amount of 10 mgs catalyst solid was charged into the reactor by pushing through a catalyst feed tube with about 500-ml liquid propylene. The catalyst utilized herein is a magnesium supported catalyst developed by and available from Toho Titanium Corporation of Japan and identified as THC-C type catalyst. The reactor temperature was raised from room temperature to 70° C. and the reactor pressure was maintained at 500 psi with a constant overpressure of hydrogen. The polymerization reaction was allowed to continue for one hour. After the polymerization period, the excess propylene was vented out of the reactor and the remaining polymer was collected and allowed to dry out inside a hood. Samples of the polymer granules were taken for analysis.

Example 1 (Comparative)

The donor system was BPIQ. Yield of polymer is 370 grams. The polymer MFR was 18.6 and the PDI (Mw/Mn) was 8.51.

Example 2 (Inventive)

The donor system was a donor blend of 85% BPIQ and 15% PTES. Yield of polymer was 388 grams. The polymer MFR was 38.3 and the PDI (Mw/Mn) was 8.41.

Example 3 (Inventive)

The donor system was a donor blend of 70% BPIQ and 30% PTES. Yield of polymer was 394 grams. The polymer MFR was 94.4 and the PDI (Mw/Mn) was 7.33.

Example 4 (Inventive)

The donor system was a donor blend of 55% BPIQ and 45% PTES. Yield of polymer was 386 grams and the PDI (Mw/Mn) was 6.41.

Example 5 (Inventive)

The donor system was a donor blend of 20% BPIQ and 80% PTES. Yield of polymer was 403 grams. The polymer MFR was 178.2 and the PDI (Mw/Mn) was 4.87.

The following examples proceeded according to the following procedure. Polymerization process occurred in a continuous reactor. Bulk propylene polymerizations were carried out in a continuous pilot plant scale slurry loop reactor system, which is a scaled down version of the commercial process known in the art as the "Spheripol Process". Catalyst (as specified above) was prepared continuously in situ by contacting catalyst solids, triethylaluminum, and the donor system. The activated catalyst was then fed continuously to a prepolymerization reactor where it was continuously prepolymerized in propylene to a productivity of approximately 100 g-polymer/g-cat. The prepolymerized catalyst was then continuously fed to a series of two bulk slurry loop PP reactors for polymerization to a productivity of approximately 50 kg-polymer/g-cat. Polymer samples were dried and mixed immediately with a primary antioxidant (see Table 1 for more details) to maintain the sample integrity.

The catalyst solids used in these examples are "fourth generation" MgCl supported Ti systems known in the art to produce propylene polymers with high stereospecificity and high catalyst productivities (as specified above). Polymer molecular weight was controlled by continuously feeding hydrogen and propylene to both of the slurry loop reactors at a constant hydrogen to propylene ratio. FIG. 1 shows the MFR-hydrogen response of the combined comparative examples versus the combined inventive examples.

Example 6 (Comparative)

The donor system used was BPIQ, which was fed to the catalyst preparation reactor at a rate sufficient to achieve 12 wppm of BPIQ relative to the propylene feed to the first slurry loop reactor. Hydrogen was fed to the reactors at a rate sufficient to achieve a product MFR of 2 dg/min.

Example 7 (Comparative)

The donor system used was BPIQ, which was fed to the catalyst preparation reactor at a rate sufficient to achieve 20 wppm of BPIQ relative to the propylene feed to the first slurry loop reactor. Hydrogen was fed to the reactors at a rate sufficient to achieve a product MFR of 2 dg/min.

Example 8 (Comparative)

The donor system used was BPIQ, which was fed to the catalyst preparation reactor at a rate sufficient to achieve 37 wppm of BPIQ relative to the propylene feed to the first slurry loop reactor. Hydrogen was fed to the reactors at a rate sufficient to achieve a product MFR of 2 dg/min. Hydrogen was also increased stepwise up to 240 wtppm (in propylene feed) to generate the comparative example MFR-hydrogen response curve shown in FIG. 1.

Example 9 (Inventive)

The donor system used was a 70:30 molar mixture of BPIQ and PTES, which was fed to the catalyst preparation reactor at a rate sufficient to achieve 12 wppm of BPIQ relative to the propylene feed to the first slurry loop reactor. Hydrogen was fed to the reactors at a rate sufficient to achieve a product MFR of 25 dg/min.

Example 10 (Inventive)

The donor system used was a 70:30 molar mixture of BPIQ and PTES, which was fed to the catalyst preparation reactor at a rate sufficient to achieve 20 wppm of BPIQ relative to the propylene feed to the first slurry loop reactor. Hydrogen was fed to the reactors at a rate sufficient to achieve a product MFR of 25 dg/min.

Example 11 (Inventive)

The donor system used was a 70:30 molar mixture of BPIQ and PTES, which was fed to the catalyst preparation reactor at a rate sufficient to achieve 37 wppm of BPIQ relative to the propylene feed to the first slurry loop reactor. Hydrogen was fed to the reactors at a rate sufficient to achieve a product MFR of 4 dg/min. Hydrogen was also increased stepwise up to 240 wtppm (in propylene feed) to generate the example MFR-hydrogen response curve shown in FIG. 1.

Example 12 (Inventive)

The donor system used was a 70:30 molar mixture of BPIQ and PTES, which was fed to the catalyst preparation reactor at a rate sufficient to achieve 37 wppm of BPIQ relative to the propylene feed to the first slurry loop reactor. Hydrogen was fed to the reactors at a rate sufficient to achieve a product MFR of 10 dg/min.

Example 13 (Inventive)

The donor system used was a 70:30 molar mixture of BPIQ and PTES, which was fed to the catalyst preparation reactor at a rate sufficient to achieve 37 wppm of BPIQ relative to the propylene feed to the first slurry loop reactor. Hydrogen was fed to the reactors at a rate sufficient to achieve a product MFR of 100 dg/min.

Example 14 (Inventive)

The donor system used was a 70:30 molar mixture of BPIQ and PTES, which was fed to the catalyst preparation reactor at a rate sufficient to achieve 37 wppm of BPIQ relative to the propylene feed to the first slurry loop reactor. Hydrogen was fed to the reactors at a rate sufficient to achieve a product MFR of 170 dg/min.

As demonstrated, the combination of the electron donors as described above show unexpected and surprising results in that the polymers they produce exhibit, for example, desirable MFRs along with broad molecular weight distributions. As a result, such polymers are well suited for certain applications as described herein.

All patents, patent applications, test procedures (such as ASTM methods), priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

TABLE 1

Examples of Polymers and physical properties

| Property | EX-6 | EX-7 | EX-8 | EX-9 | EX-10 |
|---|---|---|---|---|---|
| Donor A[1] (ppm) | 12 | 20 | 37 | | |
| Donor B[2] (ppm) | | | | 12 | 20 |
| MFR (g/10 min) | 2.3 | 2.4 | 2.1 | 21 | 26 |
| PDI or MWD by GPC | 7.7 | 6.8 | 6.5 | 6.7 | 6.4 |
| Crystallinity by LF SS NMR[3] (%) | 64 | 64 | 64 | 67 | 67 |
| Amorphous-PP by LF SS NMR[3] (%) | 2.9 | 3.1 | 2.9 | 5.9 | 5.3 |

TABLE 1-continued

Examples of Polymers and physical properties

| Property | EX-6 | EX-7 | EX-8 | EX-9 | EX-10 |
|---|---|---|---|---|---|
| Tensile at yield, psi (MPa) | 5298 | 5393 | 5554 | 5851 | 5849 |
| Elongation at Yield (%) | 10 | 9 | 8.7 | 7 | 7 |
| 1% Sec Flexural Modulus, kpsi (MPa) | 268 | 278 | 285 | 302 | 303 |
| Rockwell Hardness, R-scale | 102 | 103 | 105 | 109 | 108 |
| Gloss @ 60° | 82 | 83 | 83 | 81 | 82 |
| Room Temperature notched Izod, ft-lbs/in (KJ/m$^2$) | 1.3 | 1.3 | 1.2 | 0.5 | 0.50 |
| Heat Distortion Temperature @ 66 psi, ° C. | 110 | 112 | 114 | 116 | 120 |

[1]Donor A: BPIQ
[2]Donor B: BPIQ/PTES - 70/30 mole %
[3]Measured by low filed solid state NMR Note:
All the examples are nucleated. The add pack used for the examples was as follows: Irganox 1010 at 0.15 wt %, Ultranox 626A at 0.05 wt %, DHT4A (hydro-calcite) 0.03 wt %, and sodium benzoate (40 micron particle size) 0.10 wt %. The Irganox 1010 is purchased from Ciba Specialty Chemicals; Ultranox 626A is purchased from GE Specialty Additives; DHT4A is purchased from Mitsui and Co.; and the sodium benzoate is purchased from Mallinkrodt Co.

TABLE 2

Examples of Polymers and Physical Properties

| Property | EX-11 | EX-12 | EX-13 | EX-14 |
|---|---|---|---|---|
| Donor B[1] (ppm) | 37 | 37 | 37 | 37 |
| MFR (g/10 min) | 3.7 | 9.7 | 106 | 170 |
| PDI or MWD by GPC | 8.8 | 7.8 | 5.8 | 5.8 |
| Crystallinity by LF SS NMR[2] (%) | 65 | 66 | 68 | 69 |
| Amorphous-PP by LF SS NMR[2] (%) | 3.2 | 3.2 | 3.3 | 3.4 |
| Tensile at yield, psi (MPa) | 5595 | 5767 | 5610 | 5137 |
| Elongation at Yield (%) | 8 | 7 | 6 | 3 |
| 1% Sec Flexural Modulus, kpsi (MPa) | 295 | 301 | 284 | 295 |
| Rockwell Hardness, R-scale | 106 | 106 | 109 | 109 |
| Gloss @ 60° | 82 | 84 | 84 | 81 |
| Room Temperature notched Izod, ft-lbs/in (KJ/m$^2$) | 0.74 | 0.50 | 0.23 | 0.27 |
| Heat Distortion Temperature @ 66 psi, ° C. | 116 | 122 | 119 | 121 |

[1]Donor B: BPIQ/PTES - 70/30 mole %
[2]Measured by low filed solid state NMR
[3]Impact copolymer Note:
All the examples are nucleated. The add pack used for the examples was as follows: Irganox 1010 at 0.15 wt %, Ultranox 626A at 0.05 wt %, DHT4A (hydro-calcite) 0.03 wt %, and sodium benzoate (40 micron particle size) 0.10 wt %. The Irganox 1010 is purchased from Ciba Specialty Chemicals; Ultranox 626A is purchased from GE Specialty Additives; DHT4A is purchased from Mitsui and Co.; and the sodium benzoate is purchased from Mallinkrodt Co.

What is claimed is:

1. A catalyst system comprising:
   (a) a solid magnesium supported titanium catalyst component;
   (b) an organoaluminum co-catalyst; and
   (c) a mixture of a diaminodialkoxysilane and, a silane mixture selected from the group consisting of tetraethoxysilane (TOES), methylcyclohexyldimethoxysilane (MCMS), propyltrimethoxysilane (PTMS), propyltriethoxysilane (PTES), methytrimethoxysilane (MTMS), dimethyldimethoxysilane (DMDMS), dicyclopentydimethoxysilane (DCPMS).

2. The catalyst system of claim 1, wherein the diaminodialkoxysilane comprises bisperhydroisoquinolyldimethoxysilane (BPIQ).

3. The catalyst system of claim 2, wherein the mole ratio of bisperhydroisoquinolyldimethoxysilane to the silane mixture added to the catalyst system is from 95/5 mole ratio to 50/50 mole ratio.

4. The catalyst system of claim 2, wherein the mole ratio of bisperhydroisoquinolyldimethoxysilane to the silane mixture added to the catalyst system is from 80/20 mole ratio to 60/40 mole ratio.

5. The catalyst system of claim 2, wherein the mole ratio of bisperhydroisoquinolyldimethoxysilane to the silane mixture added to the catalyst system is from 75/25 mole ratio to 65/35 mole ratio.

6. The catalyst system of claim 2, wherein the mole ratio of bisperhydroisoquinolyldimethoxysilane to the silane mixture added to the catalyst system is at least from 70/30 mole ratio.

7. The catalyst system of claim 1, wherein the diaminodialkoxysilane comprises bisperhydroisoquinolyldimethoxysilane (BPIQ), and the silane mixture is propyltriethoxysilane (PTES).

8. The catalyst system of claim 1, wherein the solid magnesium supported titanium catalyst component comprises a magnesium supported TiCl4 catalyst comprising TiCl4 and the organoaluminum co-catalyst comprises triethylaluminum.

9. A catalyst system comprising:
   (a) a solid magnesium supported titanium catalyst component;
   (b) an organoaluminum co-catalyst;
   (c) a diaminodialkoxysilane; and
   (d) a tetraalkoxysilane.

10. The catalyst system of claim 9, wherein the diaminodialkoxysilane comprises bisperhydroisoquinolyldimethoxysilane (BPIQ).

11. The catalyst system of claim 9, wherein the tetraalkoxysilane is tetraethoxysilane.

12. The catalyst system of claim 9, wherein the solid magnesium supported titanium catalyst component comprises a magnesium supported TiCl4 catalyst comprising TiCl4 and the organoaluminum co-catalyst comprises triethylaluminum.

* * * * *